Figure 1:
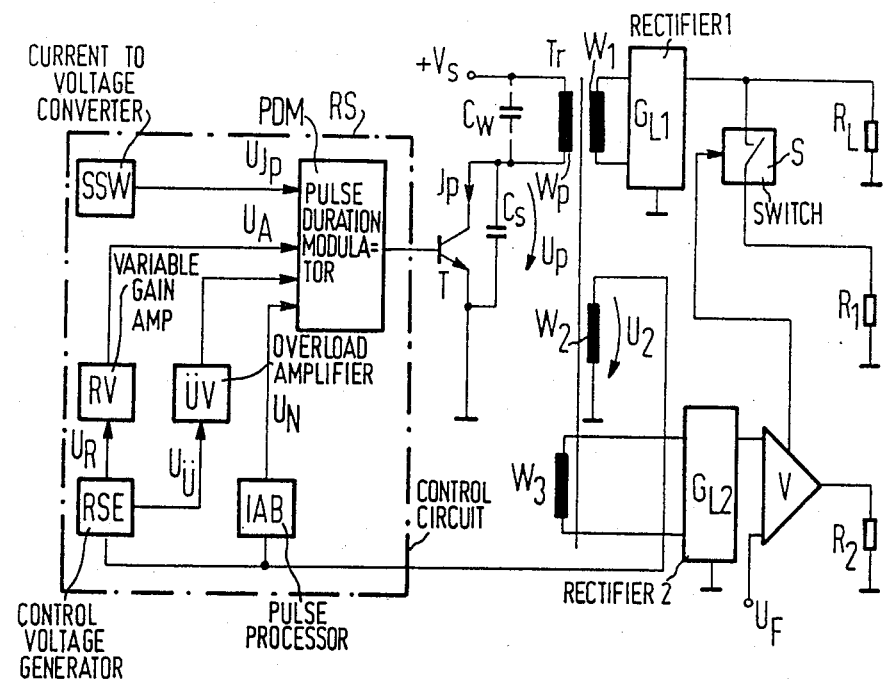

United States Patent [19]

Peruth

[11] Patent Number: 4,740,879

[45] Date of Patent: Apr. 26, 1988

[54] BLOCKING OSCILLATOR SWITCHED POWER SUPPLY WITH STANDBY CIRCUITRY

[75] Inventor: Günther Peruth, Munich, Fed. Rep. of Germany

[73] Assignee: Siemens Aktiengesellschaft, Berlin and Munich, Fed. Rep. of Germany

[21] Appl. No.: 920,235

[22] Filed: Oct. 17, 1986

[30] Foreign Application Priority Data

Oct. 17, 1985 [DE] Fed. Rep. of Germany ....... 3537065

[51] Int. Cl.$^4$ ............................................. H02M 7/537
[52] U.S. Cl. ........................................ 363/131; 363/21
[58] Field of Search ...................... 363/19, 20, 21, 131

[56] References Cited

U.S. PATENT DOCUMENTS

| | | | |
|---|---|---|---|
| 4,228,493 | 10/1980 | de Sartre et al. | 363/21 |
| 4,486,822 | 12/1984 | Marinus | 363/19 |
| 4,564,820 | 1/1986 | Peruth et al. | 363/21 |
| 4,593,347 | 6/1986 | Peruth et al. | 363/21 |
| 4,595,977 | 6/1986 | von de Ohe | 363/21 |
| 4,597,036 | 6/1986 | Paulix et al. | 363/21 |
| 4,631,652 | 12/1986 | Wendt | 363/16 |
| 4,631,654 | 12/1986 | Houre et al. | 363/21 |
| 4,692,852 | 9/1987 | Hoover | 363/21 |

FOREIGN PATENT DOCUMENTS 3312209 10/1984 Fed. Rep. of Germany .

Primary Examiner—Patrick R. Salce
Assistant Examiner—Jeffrey Sterrett
Attorney, Agent, or Firm—Herbert L. Lerner; Laurence A. Greenberg

[57] ABSTRACT

A circuit for providing standby operation in a switched power supply with a blocking oscillator, includes a control circuit, an electronic switch driven by the control circuit, and a transformer having a primary winding connected in series with the electronic switch, a first secondary winding supplying power supply to a normal load of electrical equipment, a second secondary winding driving the control circuit, and a further transformer winding strongly coupled to the primary winding and loosely coupled to the first secondary winding for generating a control signal for a standby load supply.

14 Claims, 2 Drawing Sheets

BLOCKING OSCILLATOR SWITCHED POWER SUPPLY WITH STANDBY CIRCUITRY

BACKGROUND OF THE INVENTION

1. Field of the Invention

The invention relates to a circuit for providing standby operation in a switched power supply with a blocking oscillator.

Equipment in entertainment electronics requires working and rest operations which should be capable of being switched-over without a mechanical on-and-off power switch. The rest operation is also called standby operation. The standby operation requires a minimal power loss, high efficiency, inaudible operation as well as the ability to be switched by remote control.

2. Description of the Related Art

In modern equipment provided with a blocking oscillator, the above-mentioned conditions have been met heretofore either by providing a separate standby-operation power supply and by disconnecting the blocking oscillator with a relay on the primary side of the power supply transformer, or by means of a self-oscillating or free-running blocking oscillator, where the normal load in the working operation is disconnected by a relay, and a control circuit is provided for operation with a minimum load in standby operation.

However, the no-load voltages on the secondary side increase so that destruction could occur in the event of a disturbance on the primary side.

The structure of such a blocking oscillator-switched power supply is described in more detail below and in German Published, Non-Prosecuted Application DE-OS No. 33 12 209, corresponding to U.S. Pat. No. 4,593,347.

Every modern blocking oscillator-switched power supply is constructed in such a way that it can be operated not only in normal operation but with appropriate protective circuits in overload or short-circuit operation as well. In prior art devices for providing standby operation, very high frequencies of 70 kHz, for instance, are obtained for standby operation, due to the load behavior on the secondary side. The disadvantage of such operation is that it leads to power losses in the transformer as well as to further power loss contributions due to the charge reversal of capacities.

It is accordingly an object of the invention to provide a circuit for providing standby operation in a switched power supply with a blocking oscillator, which overcomes the hereinafore-mentioned disadvantages of the heretofore-known devices of this general type and which permits standby operation at lower frequencies.

With the foregoing and other objects in view there is provided, in accordance with the invention, a circuit for providing standby operation in a switched power supply with a blocking oscillator, comprising a control circuit, an electronic switch driven by the control circuit, and a transformer having a primary winding connected in series with the electronic switch, a first secondary winding supplying power supply to a normal load of electrical equipment, a second secondary winding driving the control circuit, and a further transformer winding strongly or permanently coupled to the primary winding and loosely coupled to the first secondary winding for generating a control signal for a standby load supply.

In accordance with another feature of the invention, there is provided a comparator stage coupled to the further transformer winding, to a reference and to the standby load for supplying the standby load.

In accordance with a further feature of the invention, there is provided a switch connected to the first primary winding, to the comparator stage, to the normal load and to a further standby load, the comparator stage controlling the switch for decoupling the normal load from the first secondary winding as well as for supplying the further standby load.

In accordance with a concomitant feature of the invention, the control circuit includes a pulse width modulator, a control voltage generator, and an overload amplifier, the overload amplifier being driven by the control voltage generator when the normal load is decoupled and the overload amplifier in turn controlling the pulse width modulator for driving the electronic switch for generating a pulse-shaped control signal with a duty cycle of less than 1:10 and preferably about 1:100 and a frequency above a given audibility limit.

Other features which are considered as characteristic for the invention are set forth in the appended claims.

Although the invention is illustrated and described herein as embodied in a circuit for providing standby operation in a switched power supply with a blocking oscillator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figure 2:
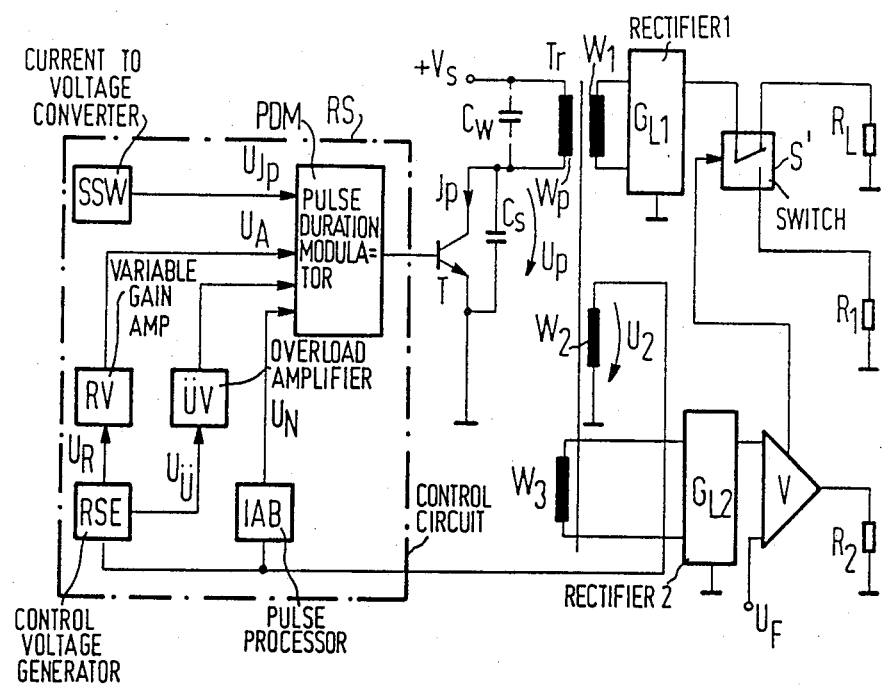

FIG. 1 is a schematic and block circuit diagram of an embodiment of the circuit according to the invention; and FIG. 2 is a view similar to FIG. 1 showing a variation of the switch controlled by the comparison stage.

Referring now to the figures in detail, and first to FIG. 1 thereof, there is seen a switched power supply with a blocking oscillator including features according to German published, Non-Prosecuted Application DE-OS No. 33 12 209, which corresponds to U.S. Pat. No. 4,593,347, having a power transistor T which serves as a control element and is connected with its emitter-collector path in series with a primary winding Wp of a transformer Tr. A d-c voltage +Vs operating the series circuit is obtained by rectification of the a-c line voltage. If an npn-transistor is used as the control element or switch T, the emitter thereof is at reference potential, the collector is at the potential of the primary winding Wp of the transformer Tr, and the other end of the primary winding Wp is at the voltage +Vs. The emitter-collector path of the transistor T is bridged by a capacitor $C_S$, while a parasitic capacity $C_w$ is connected across the primary winding Wp. The base of the transistor T is driven by a control circuit RS which is yet to be explained.

A first secondary winding $W_1$ of the transformer Tr forms the secondary side proper of the switched power supply transformer Tr which supplies electrical equipment schematically indicated by its load $R_L$, through a rectifier $G_{L1}$.

A second secondary winding $W_2$ of the transformer Tr serves as a sensor for the control circuit RS and is connected with one end thereof to reference potential and with the other end thereof to the input of the control circuit RS.

The control circuit RS contains an output circuit part PDM which controls the transistor T and is constructed in the form of a pulse-width modulator, as well as two input circuit parts controlled by the sensor winding $W_2$. One input circuit part RSE serves for generating a control voltage $U_R$ and supplies a control signal $U_A$ for the plse-width modulator PDM. Another input circuit part IAB serves for pulse processing and furnishes a signal $U_N$ for the pulse-width modulator PDM of the control circuit RS. Furthermore, a current-voltage converter SSW is provided which forms the actual-value control of the control circuit and furnishes a voltage $UJ_p$, which is proportional to the primary current for the pulse-width modulator PDM designated with reference numeral Jp.

Upon disconnecting the load of a blocking oscillator-switched power supply of the type which is described above in principle, the frequency of the pulse-shaped signal driving the switching transistor T increases. AT no-load, the frequency theoretically approaches infinity. In practice, however, it is limited to the natural frequency and the minimum pulse width which are determined by the behavior of the switching transistor T and the behavior of the pulse-width modulator PDM. This also determines the minimally possible power output. The standby load must be larger than the minimum load in order to generate a defined control voltage $U_R$, through which a constant operating point of the control amplifier RV can be provided. A non-illustrated coupling member between the pulse processing stage IAB and the control voltage generator RSE can vary the control voltage $U_R$ for a short time in the rhythm of the frequency sequence limited by to the standby load, in such a manner that a stable frequency operation becomes possible. For exact operation, the transformer Tr must meet certain quality requirements.

Every modern blocking oscillator-switched power supply is constructed in such a way that it can not only be operated in normal operation, but also with appropriate protective circuits, in overload or short-circuit operation. In heretofore-known devices for providing standby operation, very high frequencies, such as 70 kHz, are obtained for standby operation, due to the load behavior on the secondary side. However, such high frequencies lead to power losses in the transformer as well as to further power loss contributions due to the charge reversal of capacities.

According to the invention, the transformer Tr additionally includes a further winding $W_3$ which is permanently or strongly coupled to the primary winding Wp, is loosely coupled to the first secondary winding W1 and serves for generating a control signal for the standby load supply. The further winding $W_3$ feeds a further rectifier $G_{L2}$, which in turn drives a comparison stage V. The above-mentioned permanent coupling of the further winding $W_3$ to the primary winding Wp as well as the loose coupling of the further winding $W_3$ to the secondary winding $W_1$ is of such a nature that the rectifier $G_{L1}$ and the comparison stage V are supplied sufficiently in every operating state.

For standby operation, the comparison stage V is supplied with a reference $U_F$, such as by remote control, so that a standby load $R_2$ schematically represented by a resistor, is supplied if the reference is present.

Furthermore, a switch S is then driven by the comparison stage V, in such a way that the rectifier $G_{L1}$ may be connected to a further standby load $R_1$ which is also represented by a resistor, as well as to the normal load $R_L$.

FIG. 2 shows a circuit which is identical to FIG. 1 except that the comparison stage V drives a switch S' causing a partial short-circuit in such a manner that the supply of the normal load $R_L$ is disconnected and a further standby load $R_1$, which is also represented by a resistor, is supplied. By mutually coupling the windings $W_1$ and $W_2$, a voltage $U_2$ which is present at the winding $W_2$ and which drives the stages RSE and IAB in the control circuit RS, becomes so small that a control amplifier RV is cut off. However, according to a further embodiment of the invention, an overload amplifier UV provided in the control circuit RS is addressed by a voltage $U_U$ generated by the control voltage generating stage RSE. The pulse width modulator is then regulated by the stages RSE and IAB in such a manner that operation at low frequencies, such as at 17 kHz, is obtained with a duty cycle of smaller than 1:10 and preferably 1:100. Minimal power consumption from the network is thereby assured.

The foregoing is a description corresponding in substance to German Application No. P 35 37 065.3, dated Oct. 17, 1985, the International priority of which is being claimed for the instant application, and which is hereby made part of this application. Any material discrepancies between the foregoing specification and the aforementioned corresponding German application are to be resolved in favor of the latter.

I claim:

1. Circuit for providing standby operation in a switched power supply with a blocking oscillator, comprising a control circuit, an electronic switch driven by said control circuit, and a transformer having a primary winding connected in series with said electronic switch, a first secondary winding supply power supply to a normal load of electrical equipment, a second secondary winding driving said control circuit, a further transformer winding strongly coupled to said primary winding and loosely coupled to said first secondary winding for generating a control signal for a standby load supply, and a switch connected to said first secondary winding, to said normal load, and to a further standby load and controlled by said further transformer winding for decoupling the normal load from said first secondary winding as well as for supplying the further standby load.

2. Circuit according to claim 1, including a comparator stage coupled to said further transformer winding, to a reference, and to the standby load for supplying the standby load.

3. Circuit according to claim 2, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle of substantially 1:100 and a frequency above a given audibility limit.

4. Circuit according to claim 2, wherein said switch is connected to said comparator stage, said comparator stage controlling said switch for decoupling the normal load from said first secondary winding as well as for supplying the further standby load.

5. Circuit according to claim 4, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle of less than 1:10 and a frequency above a given audibility limit.

6. Circuit for providing standby operation in a switched power supply with a blocking oscillator, comprising a control circuit, an electronic switch driven by said control circuit, and a transformer having a primary winding connected in series with said electronic switch, a first secondary winding supplying power supply to a normal load of electrical equipment, a second secondary winding driving said control circuit, a further transformer winding strongly coupled to said primary winding and loosely coupled to said first secondary winding for generating a control signal for a standby load supply, and a comparator stage coupled to said further transformer winding, to a reference, and to the standby load for supplying the standby load.

7. Circuit according to claim 6, including a switch connected to said second primary winding, to said comparator stage, to the normal load, and to a further standby load, said comparator stage controlling said switch for decoupling the normal load from said first secondary winding as well as for supplying the further standby load.

8. Circuit according to claim 7, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle of less than 1:10 and a frequency above a given audibility limit.

9. Circuit according to claim 7, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle for substantially 1:100 and a frequency above a given audibility limit.

10. Circuit for providing standby operation in a switched power supply with a blocking oscillator, comprising a control circuit, an electronic switch driven by said control circuit, and a transformer having a primary winding connected in series with said electronic switch, a first secondary winding supplying power supply to a normal load of electrical equipment, a second secondary winding driving said control circuit, a further transformer winding strongly coupled to said primary winding and loosely coupled to said first secondary winding for generating a control signal for a standby load supply and a switch connected to said first secondary winding, to said normal load, and to a further standby load and controlled by said further transformer winding for changing the normal load to a larger standby load.

11. Circuit according to claim 10, wherein said switch connected to said first secondary winding, to said normal load and to a further standby load and controlled by said further transformer winding switches said further standby load parallel to the normal load.

12. Circuit according to claim 10, including a comparator stage coupled to said further transformer winding, to a reference and to the standby load for supplying the standby load.

13. Circuit according to claim 12, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle of less than 1:10 and a frequency above a given audibility limit.

14. Circuit according to claim 12, wherein said control circuit includes a pulse width modulator, a control voltage generator, and an overload amplifier, said overload amplifier being driven by said control voltage generator when the normal load is decoupled and said overload amplifier in turn controlling said pulse width modulator for driving said electronic switch for generating a pulse-shaped control signal with a duty cycle of substantially 1:100 and a frequency above a given audibility limit.

* * * * *